INVENTOR.
ROBERT M. GAGE
BY Richard S. Shreve Jr.
ATTORNEY.

2,862,099

ARC TORCH PROCESS WITH REACTIVE GASES

Robert M. Gage, Indianapolis, Ind., assignor to Union Carbide Corporation, a corporation of New York Application June 17, 1957, Serial No. 666,160

16 Claims. (Cl. 219—74)

This invention relates to a wall-stabilized arc torch process with reactive gases, and constitutes an improvement over the process disclosed in my copending applications Serial Nos. 524,353 and 539,794.

In these copending applications the gases employed have been relatively inert to the inner torch electrode which is usually tungsten. It has now been found useful to employ reactive gases containing oxygen in the arc torch process for cutting aluminum, for example. The one criterion which must be met is that the inner torch electrode be protected or shielded from the reactive gas to prevent its destruction.

The present invention employs two torch gas streams—one stream containing a reactive gas to be heated by the arc and the other stream of inert gas to shield the torch inner electrode from the reactive gas. This process is useful for all arc operations wherein a reactive gas is desired or at least is not detrimental to the materials being worked. For an example, oxygen-containing gases can be considered as the reactive gas. This means that air could be conveniently employed as an arc gas. It might thus be used for cutting, welding, plating, crystal growth or furnace heating.

Protection for the inner torch electrode can be achieved by various means. Thus far two procedures have been employed. First, an inert gas stream passes down around the inner electrode and out through the torch nozzle. The oxygen-containing stream is then injected directly into the arc stream by means of holes in the nozzle inner wall or is injected into the arc just below the stick electrode and just above the torch nozzle. The second method employs concentric gas streams separated by means of a barrier. The oxygen-containing stream then passes down around this wall and out of the torch nozzle.

The oxygen-bearing gas directly introduced into the arc zone may be oxygen, air, carbon dioxide, or water vapor. The water may be introduced into the arc area by means of a porous metal insert in the nozzle through which a portion of the nozzle cooling water may pass. Other reactive liquids may be introduced through a porous insert in a similar manner.

While the examples specifically disclose use of oxygen-containing gases, other reactive materials could be used as the primary torch gas which are compatible with the cooled torch nozzle and work materials.

Figure 1:
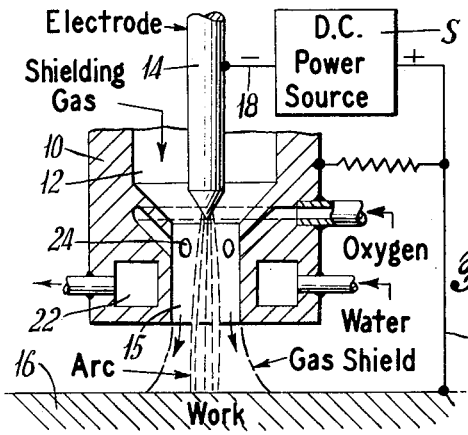
Fig. 1 is a diagram of transferred arc apparatus for injecting the oxygen-containing stream directly into the arc stream by means of holes in the nozzle inner wall.

The arc torch shown in the drawings comprises a nozzle 10 having a central socket 12, in which depends the lower end portion of a substantially non-consumable electrode 14 preferably constructed of thoriated tungsten. The electrode 14 is in spaced relation to the inner wall and bottom of the socket, providing therebetween a passage for a suitable gas, such as argon, helium, hydrogen, nitrogen or mixtures thereof, which flows axially in an annular stream about the primary electrode 14. Beyond the electrode the gas flows through an arc-stabilizing passage or orifice 15.

The other primary electrode may be the nozzle 10 or a metal workpiece 16. An arc operates in the passage 15 and between the electrode 14 and the workpiece 16 when a source of current S is connected thereto by leads 18 and 20. An extremely hot electrically conductive effluent issues from the outlet of the passage 15. The nozzle 10 is kept cool by force circulating water through an annular passage 22 surrounding the passage 15.

In the form shown in Fig. 1 the oxygen-containing gas is injected directly into the arc stream by means of holes 24 in the nozzle wall discharging into the passage 15.

In the form shown in Fig. 2 the oxygen-containing gas is injected directly into the arc stream by means of holes 25 in the nozzle wall discharging into the central socket 12 just below the electrode 14 and above the arc-stabilizing orifice 15.

Figure 3:
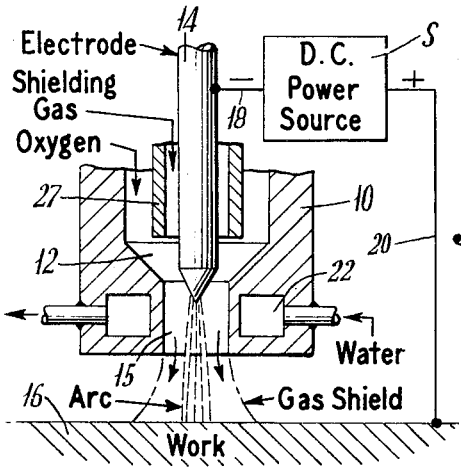
Fig. 3 is a similar diagram showing the concentric streams separated by a barrier.

In the form shown in Fig. 3 an annular sleeve 27 surrounds the electrode 14 inside the central socket 12 in concentric relation, and forms a barrier between the annular stream of shielding gas inside the sleeve 27 in contact with the electrode 14, and the annular stream of oxygen-bearing gas inside the central socket 12 and surrounding the outside of the sleeve 27.

In the form shown in Fig. 4 an annulus 30 forms a second electrode spaced below the nozzle 10 and having an orifice 32 located coaxially with the passage 15 and cooled by a water jacket 34. The source of current S is connected to the nozzle 10 through an impedance 36 and to the annulus 30 through an impedance 38. Oxygen-containing gas is introduced into the space 40 between the nozzles. Impedance 38 may be zero and the workpiece can be out-of-circuit as an alternative arrangement.

Figure 5:
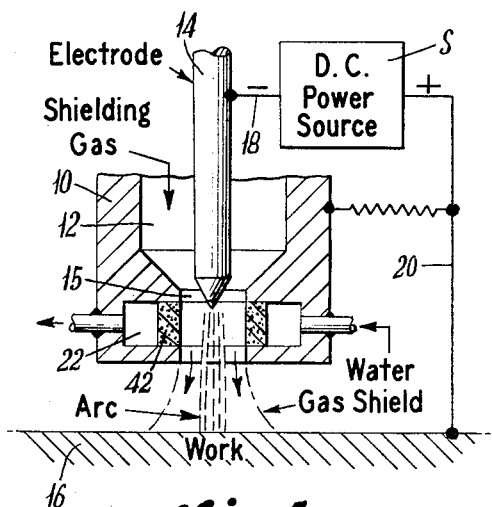
Fig. 5 is a diagram of apparatus showing liquid-vapor being introduced through a porous insert.

In the form shown in Fig. 5, an annular insert 42 of porous metal or a porous ceramic is filled in the passage 15 between this passage and the water jacket 22, to pass water through the pores to cool the orifice. The water is injected into the arc column as a vapor.

In all of the forms shown, the stream of reactive gas is introduced outside of the electrode shielding gas stream and is included in the effluent from the arc-stabilizing orifice so as to be applied directly therewith.

The following examples describe the operation of the present invention:

EXAMPLE I

*Arc torch cutting of mild steel employing oxygen-containing gases (N. B. T-5264-44)*

An apparatus of the type shown in Fig. 1 was used for this run. Argon gas at 15 C. F. H. was passed down around the 1/8" diameter tungsten stick electrode and out of the 1/8" ID nozzle while an arc was initiated between the tungsten electrode and the 1/4" thick mild steel base plate. Oxygen gas at 50–75 C. F. H. was then introduced into the nozzle below the tungsten electrode. The steel base plate was severed at arc conditions of 175–200 amps. and 45 volts (DCSP). The resulting kerf appeared to be somewhat wider than that obtained without use of oxygen.

EXAMPLE II

*Arc torch cutting of aluminum employing oxygen-containing gas (N. B. T-6506-2)*

Figure 4:
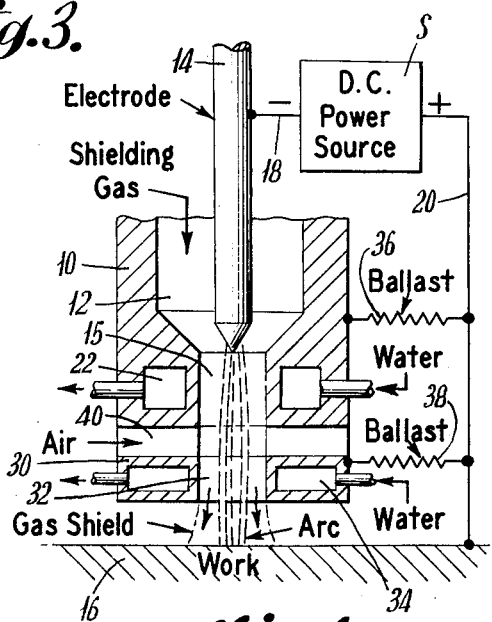
Fig. 4 is a similar diagram showing air being introduced between upper and lower nozzles.

A torch apparatus of the type shown in Fig. 4 was used for this experiment. The 1/8" diameter thoriated tungsten electrode was set back 1/8" from a water cooled copper nozzle electrode 1/8" diameter and 3/32" long. The lower nozzle was 1/8" diameter and 1/4" long and was spaced 3/16" below the first nozzle. Both ballast resistors were two 1,000 watt light bulbs. Argon gas at 15 C .F. H. was passed down through the torch, and the arc was initiated between the tungsten electrode and the 1/4" thick aluminum plate. Air was then introduced between the nozzles at 30 C. F. H. The aluminum base plate was then cut at 50 I. P. M. under arc conditions of 225 amps. and 51 volts (DCSP).

This run was repeated under conditions of 26 C. F. H. argon, 54 C. F. H. air, 195 amps., and 59 volts (DCSP) to also cut 1/4" aluminum at 50 I. P. M.

Figure 2:
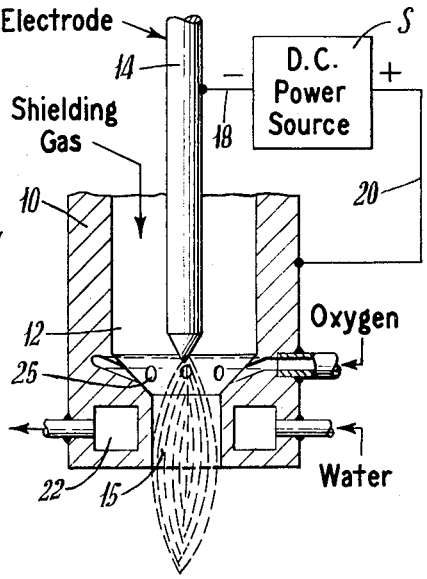
Fig. 2 is a similar diagram showing the oxygen-containing stream injected into a non-transferred arc just below the stick electrode and just above the torch nozzle outlet.

The present process is also useful in non-transferred arc torches wherein the arc passes between the inner electrode 14 and the arc-stabilizing orifice electrode 15, as shown in Fig. 2. In this case the effluent comprises hot gases and does not need an electrically conductive workpiece.

What is claimed is:

1. Process which comprises establishing an arc between two electrodes, passing along one electrode a stream of gas inert with respect thereto to shield the same, introducing a stream of gas reactive to the one electrode outside the said stream of shielding gas, and passing both streams through an orifice to form an effluent therefrom.

2. Process which comprises establishing a wall-stabilized arc between two electrodes, passing along one electrode a stream of gas inert with respect thereto to shield the same, introducing a stream of gas reactive to the one electrode outside the said stream of shielding gas, and passing both streams through an orifice to wall-stabilize the arc and form an effluent therefrom.

3. Process of claim 2 wherein the effluent is applied to a workpiece.

4. Process which comprises establishing a wall-stabilized arc between a non-consumable electrode and a workpiece, passing along said non-consumable electrode a stream of gas inert with respect thereto to shield the same, introducing a stream of gas reactive to said non-consumable electrode outside the said stream of shielding gas, passing both streams along with the arc through an orifice to form an effluent therefrom and applying said effluent to said workpiece.

5. Process which comprises establishing a wall-stabilized arc between a non-consumable electrode and an electrode containing an orifice, passing along said non-consumable electrode a stream of gas inert with respect thereto to shield the same, introducing a stream of gas reactive to said non-consumable electrode outside the said stream of shielding gas, and passing both streams through said orifice to form an effluent therefrom.

6. Apparatus which comprises means for passing along a non-consumable electrode a stream of gas inert with respect thereto to shield the same and to form an effluent, means for establishing an arc between said non-consumable electrode and another electrode, means for wall-stabilizing a portion of said arc, and means for introducing a stream of reactive gas outside of said stream of shielding gas to become a part of said effluent.

7. Apparatus which comprises means for passing along a non-consumable electrode a stream of gas inert with respect thereto to shield the same and to form an effluent, means for establishing an arc between said non-consumable electrode and a workpiece, means for wall-stabilizing a portion of said arc, means for introducing a stream of reactive gas outside of said stream of shielding gas to become a part of said effluent.

8. Apparatus which comprises means for passing along a non-consumable electrode a stream of gas inert with respect thereto to shield the same and to form an effluent, means for establishing an arc between said non-consumable electrode and an electrode containing an orifice, said orifice means wall-stabilizes a portion of said arc, means for introducing a stream of reactive gas outside of said stream of shielding gas to become a part of said effluent.

9. Apparatus which comprises an inner electrode, a tubular barrier outside of said inner electrode, means for passing along said inner electrode inside of said tubular barrier a stream of gas inert with respect to said inner electrode, means for passing a stream of reactive gas outside of said tubular barrier, means for establishing an arc between said inner electrode and another electrode, and means for wall-stabilizing a portion of said arc.

10. Apparatus which comprises means for passing along a non-consumable electrode a stream of gas inert with respect thereto to shield the same and to form an effluent, means for establishing an arc between said non-consumable electrode and another electrode, means for wall-stabilizing a portion of such arc, and porous means for introducing reactive vapors into said effluent.

11. In a gas shielded arc torch an electrode, a gas directing nozzle extending below said electrode, gas passage means for introducing a shielding gas stream which forms an effluent, gas passage means for introducing reactive gas to said effluent prior to its exit from said gas directing nozzle.

12. Process for treating a workpiece, which comprises establishing a high pressure arc between a non-consumable electrode and said workpiece through a constricted orifice which wall-stabilizes a portion of the length of such arc to produce and control the shape and direction of an effluent between said orifice and said workpiece, passing along said electrode an annual stream of shielding gas chemically inert with respect to said electrode to pass beyond said electrode and through said arc constricting orifice, passing along and outside of said shielding gas stream a separate annular stream of fluid material chemically active with respect to said electrode into direct contact with said shielding gas beyond said electrode to pass with said shielding gas through said arc constricting orifice, and applying to the workpiece said effluent from said arc constricting orifice.

13. Process for treating a workpiece which comprises establishing a high pressure arc between a non-consumable electrode and said workpiece through a constricted orifice which wall-stabilizes a portion of the length of such arc to produce and control the shape and direction of an effluent between said orifice and said workpiece, passing along said electrode an annular stream of shielding gas containing at least one gas of the group argon, helium, hydrogen and nitrogen to pass beyond said electrode and through said arc constricting orifice, passing along and outside of said shielding gas stream a separate annular stream of chemically active gas containing oxygen into direct contact with said shielding gas beyond said electrode to pass with said shielding gas through said arc constricting orifice, and applying to the workpiece said effluent from said arc constricting orifice.

14. Process for treating a workpiece which comprises establishing a high pressure arc between a non-consumable electrode and said workpiece through a constricted orifice which wall-stabilizes a portion of the length of such arc to produce and control the shape and direction of an effluent between said orifice and said workpiece, passing along said electrode an annular stream of shielding gas containing hydrogen and a gas of the group argon and nitrogen to pass beyond said electrode and through said arc constricting orifice, passing along and outside of said shielding gas stream a separate annular stream of chemically active gas containing at least one gas of the group oxygen, air, carbon dioxide and water vapor into direct contact with said shielding gas beyond said electrode to pass with said shielding gas through said arc constricting orifice, and applying to the workpiece said effluent from said arc constricting orifice.

15. Process for treating a workpiece which comprises establishing a high pressure arc between a non-consumable electrode and said workpiece through a constricted orifice which wall-stabilizes a portion of the length of such arc to produce and control the shape and direction of an effluent between said orifice and said workpiece, passing along said electrode an annular stream of shielding gas containing nitrogen to pass beyond said electrode and through said arc constricting orifice, passing along and outside of said shielding gas stream a separate annular stream of chemically active gas containing oxygen into direct contact with said shielding gas beyond said electrode to pass with said shielding gas through said arc constricting orifice, and applying to the workpiece said effluent from said arc constricting orifice.

16. Apparatus for treating a workpiece, which comprises means for establishing a high pressure arc between a non-consumable electrode and said workpiece through a constricted orifice which wall-stabilizes a portion of the length of such arc to produce and control the shape and direction of an effluent between said orifice and said workpiece, means for passing along said electrode an annular stream of shielding gas chemically inert with respect to said electrode to pass beyond said electrode and through said arc constricting orifice, means for passing along and outside of said shielding gas stream a separate annular stream of fluid material chemically active with respect to said electrode into direct contact with said shielding gas beyond said electrode to pass with said shielding gas through said arc constricting orifice, and means for applying to the workpiece said effluent from said arc constricting orifice.

References Cited in the file of this patent

UNITED STATES PATENTS

| | | |
|---|---|---|
| 2,686,860 | Buck et al. | Aug. 17, 1954 |
| 2,798,145 | Vogel | July 2, 1957 |